Nov. 6, 1928.
A. P. H. TRIVELLI
1,690,602
OPTICAL INSTRUMENT
Filed June 27, 1924
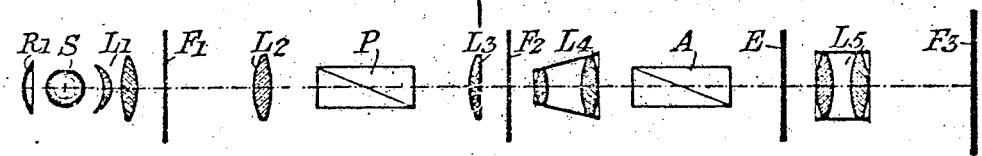
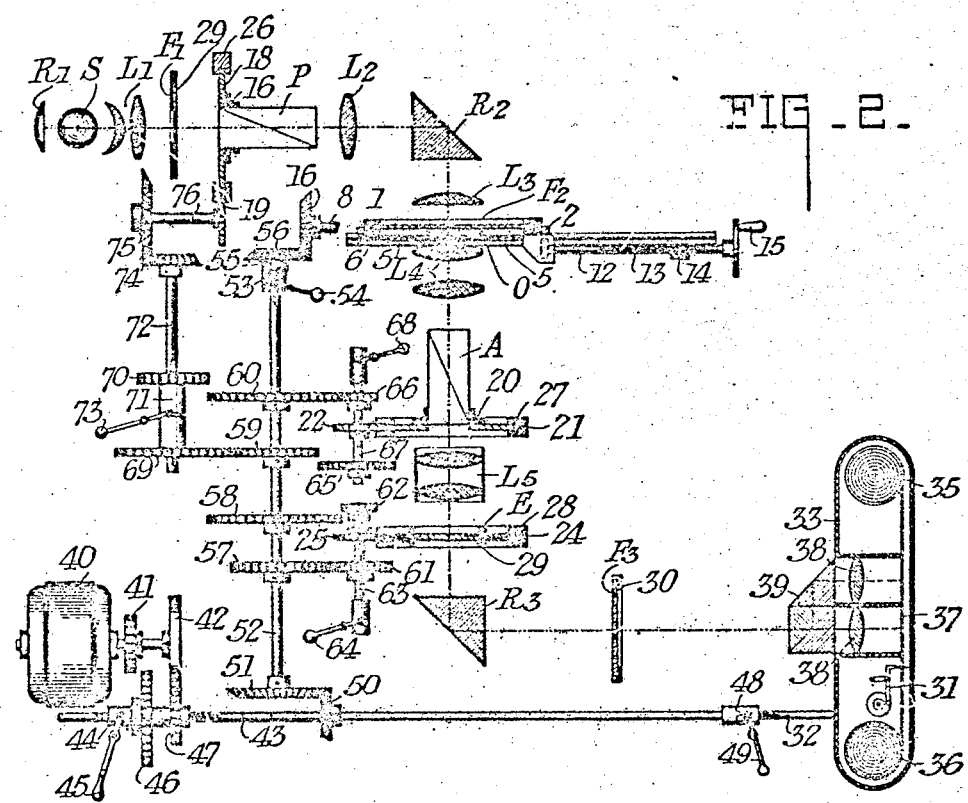
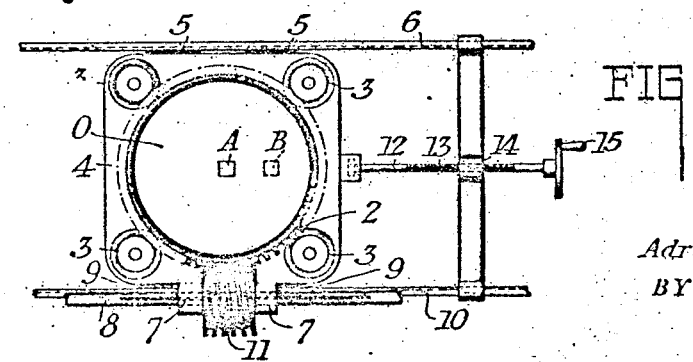
INVENTOR,
Adriaan P. H. Trivelli,
BY R. L. Stinchfield
N. M. Perrin
ATTORNEYS.

Patented Nov. 6, 1928.

1,690,602

UNITED STATES PATENT OFFICE.

ADRIAAN P. H. TRIVELLI, OF ROCHESTER, NEW YORK, ASSIGNOR TO EASTMAN KODAK COMPANY, OF ROCHESTER, NEW YORK, A CORPORATION OF NEW YORK.

OPTICAL INSTRUMENT.

Application filed June 27, 1924. Serial No. 722,837.

This invention relates to an instrument for producing and recording mobile color effects.

In particular, it is my object to obtain designs of changing color and form by projecting objects, particularly crystals, by means of polarized light, the nature of the light and the position of the objects being both changeable. Extremely varied, fantastic and richly colored effects are thus obtainable. These designs particularly when reproduced by a color motion picture process, can be projected for purposes of entertainment; they can be used as color settings for background or scenic effects for dramatic and motion picture productions, as backgrounds for titles used for motion pictures, advertising, or announcement purposes, and in many other ways.

Reference will now be made to the accompanying drawing in which:

Fig. 1 is a diagram of an optical system.

Fig. 2 is a schematic showing of an instrument embodying my invention.

Fig. 3 shows the detail of the adjustable mounting of the designed disc.

A simple diagram is used in Fig. 1 to illustrate the essential elements of the optical system. S represents a source of light, $R_1$, a reflector, and $L_1$ a condenser system, which illuminates evenly plane $F_1$ at which may be placed a diaphragm, title or design, the image of which is reproduced by an objective $L_2$ at plane $F_2$, at or near a second condenser system $L_3$. The image at $F_2$ is magnified and projected by any suitable optical system, here shown as separated groups of lenses $L_4$ and $L_5$, upon a screen at $F_3$. In the path of the beam and at any desired points on opposite sides of the plane $F_2$ are inserted two polarizing devices, such as Nicol prisms, P and A, constituting a polarizer and analyzer respectively. By relative rotation of these, the projected images of designs composed of doubly refractive material such as certain types of crystals, are colored. Noticeably brilliant colors are obtained if the light is elliptically polarized as by inserting a suitable plate E across the beam at any point.

The color effects and the brilliancy may be changed by rotation of one or more of the elements P, A and E or by their relative angular movement, the designs remaining fixed as to form. If the designs are moved, there will of course also result changes of form and if the design carrying plate is large relative to the field and carries objects of different light transmitting characteristics, as for instance an assortment of crystals, a varied changing display of color and form is produced. The magnification would depend on the particular design of the optical system, but if the object carried at $F_2$ were small crystals, the optical system could be that of any micrographic outfit, $L_3$ being a substage condenser, $L_4$ a micro-objective and $L_5$ a projection eyepiece or lens system. The images projected at $F_3$ can be used for any desired purpose, either for direct inspection or photographic reproduction. A fixed title or design may be positioned at $F_3$ for which the projected design would constitute a background.

It is to be understood that wherever I refer to a lens, there would in practice be a lens system comprising whatever combination of elements best fills the particular requirements. In Fig. 2, I have shown, largely diagrammatically, an arrangement embodying the above system which has been found useful in practice. In this figure, the relative spacing between the elements has been much shortened in order to give a compact and understandable diagram. Moreover, the casing, supports and such other mechanical details, as would be necessary in an instrument but would only confuse the showing, have been omitted and only those essential relations and arrangements disclosed as are useful to an understanding of the invention.

In this figure the same optical elements are shown and are designated as in Fig. 1. The polarizer P, is shown as between the lenses $L_1$ and $L_2$ instead of between $L_2$ and $L_3$, it being immaterial where this is placed as long as it is between the light and the plane $F_2$. For convenience of structure of the instrument, reflecting prisms $R_2$ and $R_3$ are inserted in the beam at convenient points, here shown as between $L_2$ and $L_3$ and between $L_5$ and $F_3$.

At the position $F_2$ is mounted the design plate. This is here shown as comprising a round light transmitting disc 0, which is covered with designs, deposited crystals, or the like, the designs being preferably non-symmetrical and merging one into another in every direction. This disc is in an annular frame 1 with external gear teeth 2 around its entire periphery. These mesh with idle positioning pinions 3 carried on the plate 4, which is guided at one edge by the lugs 5 sliding in the channel bar 6, and at the opposite edge by eyes slidably engaging around shaft 8, and by lugs 9 sliding in channel bar 10. Slidably but non-rotatably mounted on shaft 8 is worm 11, engaging gear teeth 2. Upon one end of the shaft 8 is a bevel gear wheel 16. Plate 4 is adjustable as a whole by rod 12, the screw threads 13 of which engage in a threaded eye in support 14, and which may be turned by handle 15. It is obvious that by turning shaft 8 and handle 15 any area such as A or B of the disc 0 can be brought to projection positions in line with the optical axis of the instrument.

The prism P is carried in the mount 16, carrying the peripheral gear 18 driven by pinion 19. The prism A is carried in the mount 20 carrying the peripheral gear 21 driven by pinion 22. The plate E is carried in mount 23 carrying the peripheral gear 24 driven by pinion 25. The gears 18, 21 and 24 are supported and guided in suitable frames 26, 27, 28 respectively.

A diaphragm, vignette, or design such as a title may be placed in the frame 29 at $F_1$, and as already noted the combined image is projected on the light transmitting screen $F_3$, where a frame 30 is provided for the location of any desired designs, such as titles. The resultant image may be viewed or photographed. In a position from which photographs of the screen may be made is placed a camera 33, preferably a motion picture color camera, the details of which constitute no part of the present invention. It is shown as including film reels 35 and 36, film 37, lenses 38, light splitting prisms 39, and a pulldown mechanism 31 driven by shaft 32.

The various movable elements above described may be driven from a common source such as an electric motor 40. On the motor shaft are a gear pinion 41, and a broken gear 42, having teeth upon a segment only of its periphery. A shaft 43 carries a sleeve 44 carrying gear 46 which will mesh with gear 41 when the sleeve is in one position, and gear 47 which will mesh with 42 when the sleeve is in its other position. Shaft 43 will thus be driven with either a continuous or intermittent motion. This shaft is in line with shaft 32 and between them is a clutch connection 48 controlled by handle 49. The relation of the segmental gear 42 to the gear 47 is such that the pulldown mechanism 31 will complete one movement for each movement of the shaft 42. When the clutch connection 48 is closed and the shaft 43 is rotating continuously the motion picture camera is driven in the usual manner, but when the shaft 43 is rotating intermittently, the camera will give a relatively long exposure between successive movements of the film 37.

Shaft 43 carries a bevel gear 50 meshing with bevel gear 51 on shaft 52, which has a clutch connection 53 controlled by handle 54 with shaft 55 upon which is bevel gear 56 meshing with gear 16. Shaft 52 carries gears 57, 58, 59 and 60, with the first two of which are adapted to mesh gears 61 and 62, respectively, carried on shaft 63. This shaft is slidably mounted with respect to pinion 25 being moved by means of handle 64. Similarly gears 59 and 60 are engagable with gears 65 and 66, respectively, on shaft 67 which is slidable with respect to pinion 22 and is controlled by handle 68. Gears 59 and 60 are also engageable with gear 69 and 70, respectively, carried on sleeve 71 which is slidably adjusted on shaft 72 by means of handle 73. Shaft 72 carries bevel gear 74 meshing with gear 75 carried on shaft 76 which also carries pinion 19. Each of the handles 64, 68 and 73 has three positions to engage one or the other of the respective pairs of gears or to disengage both. Since the gear ratios of the several pairs are different, the elements P, A and E can be given varying angular movements or be stopped; and the plate O can be rotated or adjusted when desired.

In connection with Fig. 2 it is to be understood that the mechanical connections are shown in a simple formal way, and that in practice more complicated mechanism, the details of which are not a part of my invention, will preferably be used. The gear trains will preferably be such as to move the rotating members at a low angular speed.

The operator will place a prepared plate at O and connect for continuous rotation such of the elements as he wishes. He will then watch the projected images at $F_x$. When these are of a satisfactory character, he will throw in the motion picture color camera and record the projected image. If the illumination is sufficiently brilliant, these will be recorded in the usual way. If the magnification is great, or the polarizers are so set as to pass but little light, the projected images will be dim and the handle 45 will be thrown to connect gears 42 and 47, whereupon each part connected for movement will be given an angular movement followed by a relatively long exposure of the camera, and then another angular movement during which the film is advanced in the camera.

By throwing the different clutches the operator can try different effects and have a wide range of color designs from which to select.

If the design at 29 is an opaque fixed title, or if a fixed title or design is placed at 30, there will be produced at the projection screen a fixed design with a changeable background design, the change being in color, or form, or both, projected by polarized light. It is obvious that when any of the rotatable elements are disconnected from the motor drive, they can be carefully and independently adjusted by hand.

The record will be reproduced by any desired process preferably as registering differentially colored images on opposite sides of a double coated motion picture film.

The embodiment of my invention has purposely been shown and described in a simple manner in order thereby to make the invention clear and unobscured by a mass of immaterial detail, only such structure being shown as is necessary to enable an instrument maker to design an operative apparatus; but it is to be understood that numerous variations are possible and I contemplate as within the scope of my invention all such modifications and equivalent as are included within the terms of the claims.

Having thus described my invention, what I claim as new and desire to obtain by Letters Patent is:

1. An instrument comprising a source of light, an optical system for evenly illuminating a certain plane and for projecting images from such a plane, means for positioning a design carrying member at such a plane, light polarizing means in the path of the light, a color recording motion picture camera for making a motion picture color record of such projected images, and means for simultaneously changing the character of the projected polarized light and operating the motion picture camera.

2. An instrument comprising a source of light, an optical system for evenly illuminating a certain plane and for projecting images therefrom, means for positioning at said plane objects capable of producing color images, a plurality of light polarizing means in such system and independently adjustable to vary the color effects of the projected images, a motion picture color camera for recording the projected images and a connection for adjusting at least one of the polarizing means when the camera is operating.

3. An instrument comprising a source of light, an optical system for illuminating a certain plane and for projected images therefrom, means for supporting a doubly refracting object in such plane, a plurality of adjustable light polarizing elements in such system whereby changeable color effects may be produced, a color recording motion picture camera positioned to record the projected images, and means for simultaneously operating the camera and adjusting the polarizing elements.

4. The process of making designs having changeable and striking color characteristics that comprises the steps of projecting light through a doubly refracting object, polarizing at least twice the light thus projected, moving the object during such projection, bringing to a focus an image of the object produced by the light thus projected and polarized, and taking a series of photographic color component records of the focused image.

5. An instrument comprising a source of light, an optical system for evenly illuminating a certain plane and for projecting images therefrom, a plurality of independently adjustable light polarizing means in such system, a motion picture color camera for recording the projected images and a connection for adjusting at least one of the polarizing means when the camera is operating.

6. An instrument comprising a source of light, an optical system for illuminating a certain plane and for projecting images therefrom, means for supporting an object in such plane, a plurality of adjustable light polarizing elements in such system, a color recording motion picture camera positioned to record the projected images and means for simultaneously operating the camera and adjusting the polarizing elements.

Signed at Rochester, New York, this 18th day of June, 1924.

ADRIAAN P. H. TRIVELLI.